(12) United States Patent
Zhu et al.

(10) Patent No.: US 10,681,539 B2
(45) Date of Patent: Jun. 9, 2020

(54) MULTI-BAND CHANNEL ENCRYPTING SWITCH CONTROL DEVICE AND CONTROL METHOD

(71) Applicant: INSTITUTE OF SEMICONDUCTORS, CHINESE ACADEMY OF SCIENCES, Beijing (CN)

(72) Inventors: Ninghua Zhu, Beijing (CN); Wei Chen, Beijing (CN); Jianguo Liu, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 104 days.

(21) Appl. No.: 15/387,104

(22) Filed: Dec. 21, 2016

(65) Prior Publication Data

US 2017/0181128 A1 Jun. 22, 2017

(30) Foreign Application Priority Data

Dec. 22, 2015 (CN) .......................... 2015 1 0969844
Apr. 29, 2016 (CN) .......................... 2016 1 0282372

(51) Int. Cl.
*H04L 9/06* (2006.01)
*H04W 72/04* (2009.01)
(Continued)

(52) U.S. Cl.
CPC .............. *H04W 12/00* (2013.01); *H04K 1/10* (2013.01); *H04L 9/065* (2013.01);
(Continued)

(58) Field of Classification Search
CPC ..... H04L 9/065; H04L 9/0656; H04L 9/0662; H04L 9/0861; H04L 63/0435;
(Continued)

(56) References Cited

U.S. PATENT DOCUMENTS 6,542,610 B2 * 4/2003 Traw ....................... G06F 21/10
  380/260
8,086,103 B2 * 12/2011 Beacken ............ H04Q 11/0062
  398/69
(Continued)

FOREIGN PATENT DOCUMENTS

CN 102055584 5/2011
CN 102684791 A 9/2012
(Continued)

OTHER PUBLICATIONS

First Office Action, issued in the corresponding Chinese patent application No. 201610282372.7, dated Apr. 27, 2018, 9 pages.

*Primary Examiner* — Alpus Hsu
(74) *Attorney, Agent, or Firm* — Hamre, Schumann, Mueller & Larson, P.C.

(57) ABSTRACT

A multi-band channel encrypting switch control device is provided. The device comprises a transmission part and a receiving part. The transmission part comprises: a first controller to store a secret key and to send a digital signal; an encrypting unit to encrypt the digital signal; a multi-band transmitter to select a plurality of wavebands to transmit the encrypted signal on the plurality of wavebands under control of the secret key; and a switch. The receiving part comprises: a multi-band detector to receive the encrypted signal transmitted on the plurality of wavebands; a decrypting unit to decrypt the encrypted signal; and a second controller to store the secret key and to decide whether or not to issue a switch signal by processing the signal and making decisions using the process result. A transmission device, a receiving device, (Continued)

and a control method are also provided. The encrypted data is transmitted via different channels to reduce possibility of signal interception during the transmission, thereby improving security significantly.

7 Claims, 2 Drawing Sheets

(51) Int. Cl.
   *H04W 12/00* (2009.01)
   *H04L 29/06* (2006.01)
   *H04K 1/10* (2006.01)

(52) U.S. Cl.
   CPC ........ *H04L 63/0457* (2013.01); *H04L 63/162* (2013.01); *H04W 72/04* (2013.01)

(58) Field of Classification Search
   CPC .. H04L 63/0457; H04L 63/061; H04W 12/04; H04W 72/04; H04W 72/0453
   See application file for complete search history.

(56) References Cited

U.S. PATENT DOCUMENTS

| | | | | |
|---|---|---|---|---|
| 8,135,430 B2* | 3/2012 | Plevridis | ............. | H03G 3/3047 455/126 |
| 8,401,193 B2* | 3/2013 | Ly | ......................... | H04L 9/0875 380/255 |
| 8,566,612 B2* | 10/2013 | Davis | ..................... | G06F 21/72 370/218 |
| 9,119,064 B2* | 8/2015 | Jover | ................... | H04W 12/04 |
| 9,124,929 B2* | 9/2015 | Waisbard | ............ | H04N 21/4181 |
| 9,143,320 B2* | 9/2015 | Kawamura | ............ | H04L 9/0816 |
| 9,236,891 B2* | 1/2016 | Johansson | ............ | H04B 1/0053 |
| 9,306,735 B2* | 4/2016 | Kawamura | ............. | B60R 25/24 |
| 9,509,496 B2* | 11/2016 | Kawamura | ............. | B60R 25/24 |
| 9,749,854 B2* | 8/2017 | Jover | .................... | H04W 12/04 |
| 9,774,630 B1* | 9/2017 | Kamin, III | .......... | H04L 63/0428 |
| 10,397,221 B2* | 8/2019 | Mohamed | ........... | H04L 61/6022 |
| 2003/0120915 A1* | 6/2003 | Kleinsteiber | ........... | H04L 49/10 713/153 |
| 2005/0177749 A1* | 8/2005 | Ovadia | ............... | H04J 14/0227 726/5 |
| 2007/0197901 A1* | 8/2007 | Viswanathan | ......... | A61B 34/70 600/411 |
| 2009/0313465 A1* | 12/2009 | Verma | ................ | H04L 63/0428 713/153 |
| 2013/0301834 A1* | 11/2013 | Kawamura | ........... | H04W 12/04 380/270 |
| 2014/0090019 A1* | 3/2014 | Ohmata | .............. | G06F 21/6218 726/3 |
| 2015/0235488 A1 | 8/2015 | Proefke et al. | | |
| 2016/0036813 A1* | 2/2016 | Wakumoto | .......... | H04L 63/0272 713/171 |
| 2016/0173946 A1* | 6/2016 | MacChetti | ......... | H04N 21/4623 380/239 |

FOREIGN PATENT DOCUMENTS

| | | |
|---|---|---|
| CN | 103595483 A | 2/2014 |
| CN | 103812657 A | 5/2014 |
| CN | 103873142 A | 6/2014 |
| CN | 104050740 A | 9/2014 |
| CN | 105306161 | 2/2016 |
| CN | 105897568 | 8/2016 |

* cited by examiner

MULTI-BAND CHANNEL ENCRYPTING SWITCH CONTROL DEVICE AND CONTROL METHOD

TECHNICAL FIELD

The present disclosure relates to the field of automatic control, and in particular to a multi-band channel encrypting switch control device and a control method.

BACKGROUND

Currently, security devices, such as security access systems, safes, cipher-locks, automobile locks, have been widely used to meet increasing needs for security control. However, it is difficult to improve security of secret key transmission and increase crack difficulty.

SUMMARY

The present disclosure provides, among others, a multi-band channel encrypting switch control device and a control method.

An aspect of the present disclosure provides a multi-band channel encrypting device for controlling a switch, comprising a transmission part and a receiving part, wherein:
the transmission part comprises:
a first controller to store a first secret key and to send a digital signal;
an encrypting unit to encrypt the digital signal sent by the first controller by using the first secret key to obtain an encrypted digital signal;
a multi-band transmitter to select a plurality of wavebands to transmit the encrypted digital signal on each of the plurality of wavebands respectively;
the receiving part comprises:
a multi-band detector to receive the encrypted digital signal transmitted on each of the plurality of wavebands;
a decrypting unit to decrypt the encrypted digital signal by using a second secret key to obtain a decrypted digital signal; and
a second controller to issue a switch control signal to turn off the switch in response to the decrypted digital signal being matched with a predetermined data stored in the second controller,
wherein the second controller is coupled with the switch; the predetermined data is corresponding to the digital signal sent by the first controller.

Optionally, the multi-band transmitter may comprise a plurality of transmitters, wherein: the plurality of transmitters may each transmit a different frequency; and the plurality of transmitters may be of a same type selected from a group consisting of a microwave transmitter, a light wave transmitter, an X-ray transmitter, a radio frequency transmitter, or a terahertz transmitter.

Optionally, the multi-band transmitter may comprise a plurality of transmitters of two or more different types selected from group consisting of a microwave transmitter, a light wave transmitter, an X-ray transmitter, a radio frequency transmitter, or a terahertz transmitter.

Optionally, the encrypting unit may be an integrated microelectronic encrypting chip or comprises separate devices.

Optionally, the switch may comprise any one selected from a group consisting of a mechanical switch, an electronic switch, or a micro-electro-mechanical system (MEMS) switch.

Optionally, the transmission part and the receiving part may each comprise a power supply driving unit.

Another aspect of the present disclosure provides a multi-band channel encrypting method for controlling a switch, comprising:
S1, encrypting a digital signal by using a first secret key set by a user to obtain an encrypted digital signal;
S2, selecting a plurality of wavebands and transmitting the encrypted digital signal on each of the plurality of wavebands respectively;
S3, receiving the encrypted digital signal transmitted on each of the plurality of wavebands and decrypting the encrypted digital signal by using a second secret key to obtain a decrypted digital signal; and
S4, comparing the decrypted digital signal with a predetermined data and issuing a switch control signal to turn off a switch if they are match,
wherein the predetermined data is corresponding to the digital signal.

Another aspect of the present disclosure provides a multi-band channel encrypting transmission part, comprising:
a first controller to store a first secret key set by a user and to send a digital signal;
an encrypting unit to encrypt the digital signal sent by the first controller by using the first secret key to obtain an encrypted digital signal; and
a multi-band transmitter to select a plurality of wavebands to transmit the encrypted digital signal on each of the plurality of wavebands respectively,
wherein the digital signal is corresponding to a predetermined data.

Another aspect of the present disclosure provides a multi-band channel encrypting receiving part for a switch, comprising:
a multi-band detector to receive an encrypted digital signal transmitted on each of a plurality of wavebands;
a decrypting unit to decrypt the encrypted digital signal by using a second secret key to obtain a decrypted digital signal; and
a second controller to issue a switch control signal to turn off the switch in response to the decrypted digital signal being matched with a predetermined data stored in the second controller,
wherein the second controller is coupled with the switch; the predetermined data is corresponding to a digital signal, and the encrypted digital signal is obtained by encrypting the digital signal.

Another aspect of the present disclosure provides a mutual-verification optical encrypted switch system, comprising a switch control device and a lock device, wherein:
the switch control device comprises a switch button, a first controller, a first light transmitter, and a first light receiver;
the lock device comprises a second light receiver, a second light transmitter, a second controller, and a motor-driven switch;
the first controller and the second controller are each implemented as a single-chip microcontroller;
in the switch control device: the first controller is turned on/off under control of the switch button; the first controller is coupled with the first light transmitter and the first light receiver; and
in the lock device: the second light receiver and the second light transmitter are coupled with the second controller; and the second controller is coupled with the motor-driven switch to control the on/off of the motor-driven switch.

Optionally, the first controller may store a first secret key set by a user and send a digital control signal to load the first light transmitter with control and cipher information.

Optionally, the first light receiver may receive a light signal to compare with a lock-device-end verification secret key, which is set by the user and stored in the first controller.

Optionally, the second controller may store a second secrete key set by the user and send a digital control signal to load the second light transmitter with control and cipher information.

Optionally, the first light transmitter and the second light transmitter may each comprise a plurality of transmitters. The plurality of transmitters may be of two or more different types of transmitters selected from a group consisting of a microwave transmitter, a light wave transmitter, an X-ray transmitter, a radio frequency transmitter, or a terahertz transmitter; or the plurality of transmitters each transmit a different frequency and the plurality of transmitters are of a same type selected from a group consisting of a microwave transmitter, a light wave transmitter, an X-ray transmitter, a radio frequency transmitter, or a terahertz transmitter. one or more of the plurality of transmitters are selected to transmit encrypted information under control of the secrete key. When the plurality of transmitters are of a same type, the plurality of transmitters may transmit more than two different frequencies.

Figure 1:
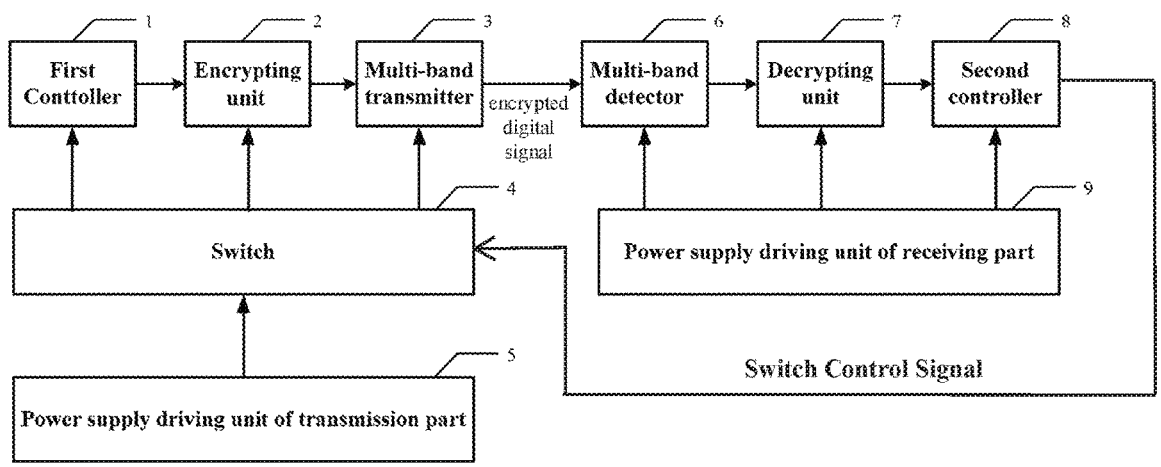
FIG. 1 schematically shows a block diagram of a multi-band channel encrypting switch control device according to an embodiment of the present disclosure.

The reference numerals are defined as follows:

1: first controller; 2: encrypting unit 3: multi-band transmitter; 4: switch; 5: power supply driving unit of transmission part; 6: multi-band detector; 7: decrypting unit 8: second controller; 9: power supply driving unit of receiving part.

Figure 2:
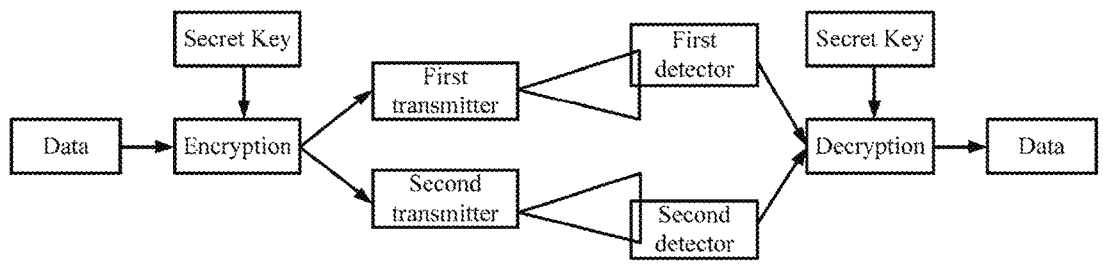

FIG. 2 schematically shows the principle of encryption and decryption according to an embodiment of the present disclosure.

Figure 3:
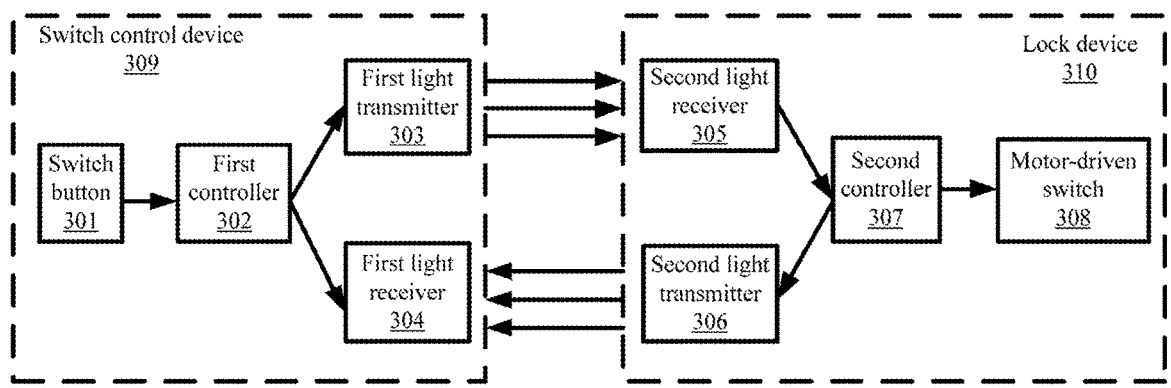

FIG. 3 schematically shows a block diagram of a non-contact optical communication verification optical encrypted switch system 300.

Figure 4:
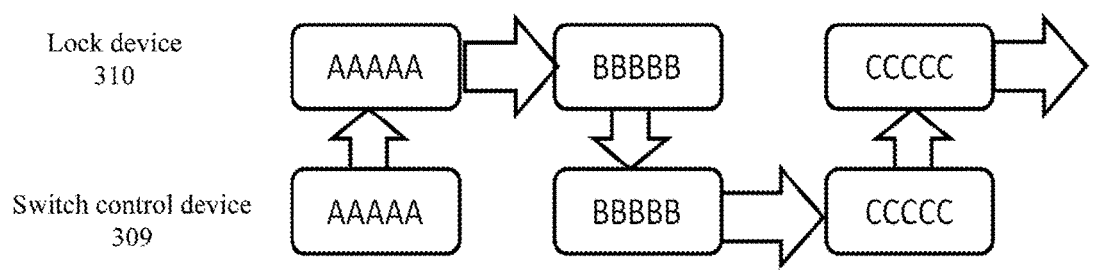

FIG. 4 schematically shows a verification process of a switch secret key.

DETAILED DESCRIPTION

The present disclosure will be explained in detail in combination with embodiments with reference to accompanying drawings.

In the specification, same or similar reference numerals represent same or similar elements. The embodiments described below with reference to the accompanying drawings are illustrative, and are only used for explaining the present disclosure instead of limiting the same.

The present disclosure provides an encrypting and transmission method. Data stored in a first controller is encoded using a secret key and is then transmitted as a signal with a multi-band transmitter. The signal is received by a multi-band detector and decrypted using the same secret key to obtain a decrypted data. The decrypted data is compared with the stored data and a switch authorization is issued if they are the same.

The present disclosure provides a multi-band channel encrypting switch control device comprising a transmission part and a receiving part. The transmission part comprises: a first controller to store a secret key and to send a digital signal; an encrypting unit to encrypt the digital signal; a multi-band transmitter to select a plurality of wavebands to transmit the encrypted signal under control of the secret key; and a switch. The receiving part comprises: a multi-band detector to receive the encrypted signal transmitted on the plurality of wavebands; a decrypting unit to decrypt the encrypted signal; and a second controller to store the secret key and to decide whether or not to issue a switch signal by processing the signal and making decisions using the process result.

FIG. 1 schematically shows a diagram of a multi-band channel encrypting switch control device according to an embodiment of the present disclosure. The multi-band channel encrypting switch control device comprises a transmission part and a receiving part. The transmission part comprises a first controller 1, an encrypting unit 2, a multi-band transmitter 3, a switch 4, and a transmission part power supply driving unit 5. The receiving part comprises a multi-band detector 6, a decrypting unit 7, a second controller 8, and a receiving part power supply driving unit 9.

In the transmission part:

The first controller 1 stores a secret key set by a user. The first controller 1 sends out a digital control signal, which is encrypted by the encrypting unit 2 and then sent to the multi-band transmitter 3.

The encrypting unit 2 encrypts the signal sent by the first controller 1. The encrypting unit 2 may be implemented by any known encrypting device. For example, it may be implemented by an integrated microelectronic encrypting chip or comprise more than one separate devices.

The multi-band transmitter 3 may comprise any known transmitters. For example, the multi-band transmitter may comprise a plurality of transmitters of two or more different types selected from a group consisting of a microwave transmitter, a light wave transmitter, an X-ray transmitter, a radio frequency transmitter, or a terahertz transmitter. Alternatively, the multi-band transmitter may comprise a plurality of transmitters of a same type, the plurality of transmitters each transmitting a different frequency. One or more transmitters are selected from the plurality of transmitters to transmit the encrypted signal under control of the secret key.

The switch 4 may comprise any known switch. For example, the switch 4 may comprise any one selected from a group consisting of a mechanical switch, an electronic switch, or an MEMS switch.

Optionally, the transmission part may further comprise a transmission part power supply driving unit 5. The transmission part power supply driving unit 5 may comprise any known power supply, e.g., dry battery, lithium battery, or any rechargeable battery.

In the receiving part:

The multi-band detector 6 receives the encrypted signal transmitted on the plurality of wavebands.

The decrypting unit 7 decrypts a detected signal, which has been encrypted by the encrypted unit 2. The decrypting unit 7 may comprise any known decrypting device. Optionally, the decrypting unit 7 may comprise an integrated microelectronic decrypting chip or more than one separate devices.

The controller 8 stores a secret key set by the user and determines whether or not to issue a switch signal by processing the decrypted signal and making decisions using the process result.

Optionally, the signal receiving part may further comprise a receiving part power supply driving unit 5. The receiving part power supply driving unit 5 may comprise any known power supply, e.g., dry battery, lithium battery, or any rechargeable battery.

FIG. 2 schematically shows the principle of encryption and decryption according to an embodiment of the present disclosure.

FIG. 2 shows the principle of encryption and decryption of the multi-band channel encrypting switch control device. Data stored in a first controller 1 is sent to and encrypted by the encrypting unit 2 using the secret key, and sent to the multi-band transmitter 3. The multi-band transmitter 3 may comprise, for example, a first transmitter and a second transmitter.

The multi-band detector 6, which may comprise a first detector and a second detector, receives the signal transmitted by the multi-band transmitter 3. The signal is decrypted by the decrypting unit 7 using the same secret key to obtain a decrypted data. The decrypted data is compared with data by the second controller 8, wherein the data is the same as that stored in the first controller. A switch signal is issued if the decrypted data is the same as that data.

As shown in FIG. 1, a multi-band channel encrypting transmission part according to an embodiment of the present disclosure comprises: a first controller to store a first secret key and to send a digital signal; an encrypting unit to encrypt the digital signal by using the first secret key to obtain an encrypted digital signal; a multi-band transmitter to select a plurality of wavebands to transmit the encrypted digital signal on each of the plurality of wavebands respectively. Wherein the digital signal is corresponding to a predetermined data, and the predetermined data is same with a data stored in the first controller, and the first controller send the digital signal according to the data.

As shown in FIG. 1, a multi-band channel encrypting receiving part according to an embodiment of the present disclosure comprises: a multi-band detector to receive the encrypted digital signal transmitted on each of the plurality of wavebands; a decrypting unit to decrypt the encrypted digital signal by using a second secret key to obtain a decrypted digital signal; and a second controller to store the second secret key and issue a switch control signal to turn off the switch in response to the decrypted digital signal being matched with a predetermined data stored in the second controller. Wherein the second controller is coupled with the switch; the predetermined data is corresponding to a digital signal, and the encrypted digital signal is obtained by encrypting the digital signal, and the predetermined data is same with a data, and the digital signal is sent according to the data.

The multi-band channel encrypting switch device and its encryption method enhances encryption performance with respect to conventional security system and switch device.

The encrypted signal can be transmitted in parallel by different communication methods, such as visible light communication, infrared light communication, radio frequency signal, or terahertz signal. A malicious user may have to use the same transmitters to transmit a crack signal.

The switch signal is issued only when the secret keys are matched at the transmission part and the receiving part and meanwhile the data are matched at the transmission part and the receiving part.

The encrypted data is transmitted via different channels so that possibility of signal interception during the transmission is reduced, thereby improving security significantly.

FIG. 3 schematically shows a block diagram of a mutual-verification optical encrypted switch system 300. The optical encrypted switch system 300 comprises a switch control device 309 and a lock device 310. The switch control device 309 comprises a switch button 301, a first controller 302, a first light transmitter 303, and a first light receiver 304. The lock device 310 comprises a second light receiver 305, a second light transmitter 306, a second controller 307, and a motor-driven switch 308. The first controller 302 and the second controller 307 may each implemented as a single-chip microcontroller.

In the switch control device 309, the first controller 302 is turned on/off under control of the switch button 301. The first controller 302 is coupled with the first light transmitter 303 and the first light receiver 304. In the lock device 310, the second light receiver 305 and the second light transmitter 306 are coupled with the second controller 307. The second controller 307 is coupled with the motor-driven switch 308 to control the on/off of the motor-driven switch 308.

The first controller 302 stores a first secret key set by a user and sends a digital control signal to load the first light transmitter 303 with control and cipher information. The first light receiver 304 receives a light signal to compare with a lock-device-end verification secret key, which is set by the user and stored in the first controller 302. The second controller 307 stores a second secrete key set by the user and sends a digital control signal to load the second light transmitter 306 with control and cipher information.

The first light transmitter 303 and the second light transmitter 306 may each comprise a plurality of transmitters. The plurality of transmitters may be of two or more different types of transmitters selected from a group consisting of a microwave transmitter, a light wave transmitter, an X-ray transmitter, a radio frequency transmitter, or a terahertz transmitter. Alternatively, the plurality of transmitters may each transmit a different frequency; and the plurality of transmitters may be of a same type selected from a group consisting of a microwave transmitter, a light wave transmitter, an X-ray transmitter, a radio frequency transmitter, or a terahertz transmitter. One or more of the transmitters are selected to transmit encrypted information under control of the secrete key.

FIG. 4 schematically shows a verification process of a switch secret key. The switch control device sends an information "AAAA". The lock device sends an information "BBBB" if it verifies the information "AAAA" to be correct. The switch control device sends a switch secret key "CCCC" when it receives the information "BBBB". The lock device activates a motor of the motor-driven switch to turn on the motor-driven switch.

Although the present disclosure has been described above with reference to preferable embodiments, the preferable embodiments are not intended to limit the present disclosure. Many possible variations and modifications can be made to the technical solutions of the present disclosure or changes can be made to the technical solutions of the present disclosure to obtain equivalent embodiments by any skilled person in the art using the method and technical contents described above without departing from the scope of the technical solutions of the present disclosure. Therefore, any simple change, equivalent variation, or modification made to the above embodiments according to the technical spirit of the present disclosure without departing from the contents of the technical solutions of the present disclosure should fall within the protection scope of the technical solutions of the present disclosure.

We claim:

1. A multi-band channel encrypting switch control device for controlling a switch, comprising a transmission part and a receiving part, wherein:

the transmission part comprises:
a first controller to store a first secret key set by a user and to send a digital signal;
an encrypting unit to encrypt the digital signal sent by the first controller by using the first secret key to obtain an encrypted digital signal;
a multi-band transmitter including a plurality of transmitters to select a plurality of wavebands to transmit the encrypted digital signal on each of the plurality of wavebands respectively; and the receiving part comprises:
a multi-band detector including a plurality of detectors to receive the encrypted digital signal transmitted on each of the plurality of wavebands;
a decrypting unit to decrypt the encrypted digital signal by using a second secret key to obtain a decrypted digital signal; and
a second controller to issue a switch control signal to turn off the switch in response to the decrypted digital signal being matched with a predetermined data stored in the second controller,
wherein the second controller is coupled with the switch; the plurality of transmitters is selected from a group consisting of a microwave transmitter, a light wave transmitter, an X-ray transmitter, a radio frequency transmitter, or a terahertz transmitter; the predetermined data is corresponding to the digital signal sent by the first controller; the first secret key is the same as the second secret key.

2. The multi-band channel encrypting switch control device according to claim 1, wherein
the plurality of transmitters each transmits at a different frequency; and
the plurality of transmitters is of a same type.

3. The multi-band channel encrypting switch control device according to claim 1, wherein the plurality of transmitters comprises two or more different types of transmitters.

4. The multi-band channel encrypting switch control device according to claim 1, wherein the encrypting unit comprises an integrated microelectronic encrypting chip or separate devices.

5. The multi-band channel encrypting switch control device according to claim 1, wherein the switch comprises any one selected from a group consisting of a mechanical switch, an electronic switch, or a micro-electro-mechanical system (MEMS) switch.

6. The multi-band channel encrypting switch control device according to claim 1, wherein the transmission part and the receiving part each comprises a power supply driving unit.

7. A multi-band channel encrypting switch control method for controlling a switch, comprising:
S1, encrypting a digital signal by using a first secret key set by a user to obtain an encrypted digital signal;
S2, selecting, by a plurality of transmitters in a multi-band transmitter, a plurality of wavebands and transmitting the encrypted digital signal on each of the plurality of wavebands respectively;
S3, receiving, by a plurality of detectors in a multi-band detector, the encrypted digital signal transmitted on each of the plurality of wavebands and decrypting the encrypted digital signal by using a second secret key to obtain a decrypted digital signal; and
S4, comparing the decrypted digital signal with a predetermined data and issuing a switch control signal to turn off a switch if they match,
wherein the plurality of transmitters is selected from a group consisting of a microwave transmitter, a light wave transmitter, an X-ray transmitter, a radio frequency transmitter, or a terahertz transmitter; the first secret key is the same as the second secret key.

* * * * *